US008883694B2

(12) United States Patent
Sehgal et al.

(10) Patent No.: US 8,883,694 B2
(45) Date of Patent: Nov. 11, 2014

(54) POLYSACCHARIDE SLURRIES WITH ENVIRONMENTALLY FRIENDLY ACTIVATOR SOLVENTS

(71) Applicant: Rhodia Operations, Aubervilliers (FR)

(72) Inventors: Amit Sehgal, Cherry Hill, NJ (US); Subramanian Kesavan, East Windsor, NJ (US); Ruela Pabalan, Burlington, NJ (US); Charles Aymes, Monmouth Junction, NJ (US)

(73) Assignee: Rhodia Operations, Paris (FR)

( * ) Notice: Subject to any disclaimer, the term of this patent is extended or adjusted under 35 U.S.C. 154(b) by 0 days.

(21) Appl. No.: 13/864,871

(22) Filed: Apr. 17, 2013

(65) Prior Publication Data

US 2013/0274152 A1    Oct. 17, 2013

Related U.S. Application Data

(60) Provisional application No. 61/625,427, filed on Apr. 17, 2012.

(51) Int. Cl.
*C09K 8/20* (2006.01)
*C09K 8/32* (2006.01)
*C09K 8/64* (2006.01)

(52) U.S. Cl.
CPC .... *C09K 8/64* (2013.01); *C09K 8/32* (2013.01)
USPC .......................................... 507/211; 507/244

(58) Field of Classification Search
None
See application file for complete search history.

(56) References Cited

U.S. PATENT DOCUMENTS

| | | | |
|---|---|---|---|
| 4,470,928 A | 9/1984 | Kimura et al. | |
| 4,623,748 A | 11/1986 | Johnson | |
| 4,673,524 A | 6/1987 | Dean | |
| 4,934,391 A | 6/1990 | Futch et al. | |
| 5,001,231 A | 3/1991 | Zapico | |
| 5,024,780 A | 6/1991 | Leys | |
| 5,252,780 A | 10/1993 | Ramos et al. | |
| 5,346,640 A | 9/1994 | Leys | |
| 5,354,492 A | 10/1994 | Short | |
| 5,378,386 A | 1/1995 | Short et al. | |
| 5,419,848 A | 5/1995 | Van Eenam | |
| 5,573,710 A | 11/1996 | McDonnell | |
| 5,672,579 A | 9/1997 | Diaz et al. | |
| 5,674,823 A | 10/1997 | Ricca et al. | |
| 6,165,962 A | 12/2000 | Kaler et al. | |
| 6,172,031 B1 | 1/2001 | Stevens | |
| 6,265,367 B1 | 7/2001 | Callaghan et al. | |
| 6,284,720 B1 | 9/2001 | Opre | |
| 6,306,223 B1 | 10/2001 | Joye | |
| 6,355,113 B1 | 3/2002 | Nalewajek et al. | |
| RE37,849 E * | 9/2002 | Pokorny | 510/206 |
| 6,620,769 B1 | 9/2003 | Juppe et al. | |
| 6,706,676 B2 | 3/2004 | Swensen | |
| 7,037,882 B2 | 5/2006 | Howey et al. | |
| 7,199,092 B2 | 4/2007 | Lu et al. | |
| 7,271,140 B2 | 9/2007 | Durrant | |
| 7,309,684 B2 | 12/2007 | Filippini et al. | |
| 7,468,345 B2 | 12/2008 | Decker | |
| 7,478,455 B2 | 1/2009 | Heim | |
| 7,501,470 B2 | 3/2009 | Adam et al. | |
| 7,547,670 B2 | 6/2009 | Gross et al. | |
| 7,579,017 B2 | 8/2009 | Murphy et al. | |
| 7,622,436 B2 | 11/2009 | Tuzi et al. | |
| 7,790,774 B1 | 9/2010 | Kinsey et al. | |
| 8,147,813 B2 | 4/2012 | Beauquey et al. | |
| 2004/0000329 A1 | 1/2004 | Albu et al. | |
| 2007/0092477 A1 | 4/2007 | Cheung et al. | |
| 2008/0119374 A1 * | 5/2008 | Willberg et al. | 507/209 |
| 2009/0224204 A1 | 9/2009 | Marion et al. | |
| 2009/0281012 A1 * | 11/2009 | Trivedi et al. | 510/138 |
| 2011/0071056 A1 | 3/2011 | Saini et al. | |
| 2011/0166025 A1 * | 7/2011 | Jentzer et al. | 504/358 |

FOREIGN PATENT DOCUMENTS

| | | |
|---|---|---|
| WO | WO 94/17145 A1 | 8/1994 |
| WO | WO 01/30957 | 5/2001 |
| WO | WO 2005/028606 A1 | 3/2005 |
| WO | WO 2006/055713 A1 | 5/2006 |
| WO | WO 2007/101929 A1 | 9/2007 |
| WO | WO2009/092795 * | 7/2009 |
| WO | WO2011/028274 * | 3/2011 |

OTHER PUBLICATIONS

Ghuiba, et al., "The Use of Egyptian Fusel Oil got the Preparation of Some Plasticizers Compatible with Polyvinyl Chloride", Indian Journal of Technology, vol. 23, Aug. 1985, pp. 309-311.
Kob, "Dibasic Ester: A Low Risk, Green Organic Solvent Alternative", American Chemical Society, May 24, 2002.
Solo Pak Pty Ltd., "Earth Renewable Heavy Duty Degreaser", Material Safety Data Sheet, Sep. 25, 2008, pp. 1-6.
International Search Report and Written Opinion by KIPO on Jul. 22, 2013.

* cited by examiner

*Primary Examiner* — Susannah Chung
*Assistant Examiner* — Kumar R Bhushan
(74) *Attorney, Agent, or Firm* — Michael B. Fein, Esq.; Eckert Seamans Cherin & Mellott, LLC

(57) ABSTRACT

A stable polysaccharide particle suspension composition comprising: a carrier; an activator solvent comprising a) at least one dibasic methyl or ethyl ester; b) at least one compound of the formula $R_3OOC-A-CONR_4R_5$ (IIa), wherein $R_3$ represents a $C_1$-$C_{36}$ alkyl group; wherein $R_4$ and $R_5$ individually represents a $C_1$-$C_{36}$ alkyl group, wherein $R_4$ and $R_5$ can optionally together form a ring; and wherein A is a linear or branched divalent $C_2$-$C_6$ alkyl group; or c) a combination a) and b); an organo clay compound; and optionally, a surfactant; the composition being stable and capable of suspending polysaccharide particles. Slurries of polysaccharide particles in such suspension composition and methods of making the compositions and the slurries.

18 Claims, No Drawings

POLYSACCHARIDE SLURRIES WITH ENVIRONMENTALLY FRIENDLY ACTIVATOR SOLVENTS

CROSS-REFERENCE TO RELATED APPLICATIONS

The application claims the benefit of U.S. Provisional Application Ser. No. 61/625,427 filed Apr. 17, 2012, which is hereby incorporated by reference.

FIELD OF THE INVENTION

This invention relates to compositions and methods for use of polysaccharide slurries and suspension compositions and, in particular, slurries and suspension compositions comprising environmentally friendly solvents and activator solvents.

BACKGROUND OF THE INVENTION

The use of glycol ethers, especially ethylene glycol mono butyl ethers (EGMBE), has come under increased pressure from a health, safety and environment (HSE) perspective. EGMBE is a suspected carcinogen for humans, causes hemolysis, is under strict scrutiny in California, and is being phased out in Canada. With full disclosure rules for oil and gas chemicals being adopted for hydraulic fracturing fluids in most oil producing states jurisdictions, there is an increased urgency to have greener solvents in formulations. Oil and gas service companies are looking for viable alternatives which provide good performance and HSE profile. Some solvents have been used instead of EGMBE; however, many such solvents suffer the same drawbacks as EGMBE, such as being environmentally unfriendly or similarly toxic and hazardous. These are other glycol ethers like PnB (propylene glycol n-butyl ether), butyl carbitol (diethylene glycol butyl ether), ethylene glycol monoacetate, triethylene glycol monoethyl ether, 1,1'-oxybis(2-propanol), triethylene glycol monomethyl ether, triglyme and diglyme, which were reported more often than many "priority pollutants".

Glycol ethers are commonly used as activator solvents in guar gum-mineral oil slurries ("guar slurries"). Guar slurries are dispersions of dry guar particles in mineral oil with hydrophobically modified clay as the suspending aid. Glycol ether solvents, e.g., ethylene glycol mono butyl ether (EGMBE), are conventionally added as activator solvents for the clay. Such activator solvents break up the galleries to disperse the clay platelets in mineral oil (i.e., "activates" the clay). As used herein, the term "activator solvent" means a compound which is added to the suspension composition to assist the clay component therein to develop viscosity. The activated clay serves to thicken (i.e., increase viscosity of) the carrier, generally mineral oil, or to form a weak gel or pre-gel to help suspend the guar particles and make a stable slurry. The carrier can also include polyethers, esters, higher alcohols, or vegetable oils, aside from mineral oil, as well as mixtures thereof. Stable slurries where the guar or polysaccharide particles remain suspended for a sufficient period of time are important in application for storage and transport. If the particles settle and hard pack as a sediment, the slurry becomes hard to handle and difficult to pump or pour out of drums in the field. In some conventional embodiments the slurries contain a small amount of surfactant and/or acid components to help with the hydration of the slurries. Such additional components can also have an impact on the viscosity of the slurry to facilitate handling.

SUMMARY OF THE INVENTION

We have discovered that compositions and methods that utilize esters of diacids, derivatives thereof, mixtures thereof, as well as the foregoing with other solvents, as activator solvents for the clay in guar slurries. Direct substitution of EGMBE or PnB with a) at least one dibasic methyl or ethyl ester; b) at least one compound of formula (IIa): $R_3OOC-A-CONR_4R_5$ (IIa), wherein $R_3$ represents a $C_1$-$C_{36}$ alkyl group; wherein $R_4$ and $R_5$ individually represents a $C_1$-$C_{36}$ alkyl group, wherein $R_4$ and $R_5$ can optionally together form a ring; and wherein A is a linear or branched divalent $C_2$-$C_6$ alkyl group; or c) a combination a) and b) is advantageous in dispersing clay and providing stable guar slurries. This includes derivatives such as Activator Solvent B (pentanoic acid, 5-(dimethylamino)-2-methyl-5-oxo-, methyl ester).

The activator solvent is added to the mineral oil and mixed with the clay or modified clay to disperse the clay. In one embodiment, the modified clay is hydrophobically modified clay. The clay may be modified by the adsorption, reaction or complexation of small or polymeric organic species that include a range from cationic surfactants, cationic polymers, amines, chlorosilanes to folic acid. In one embodiment, the modified clay is hydrophobically modified clay usually obtained by complexation with cationic surfactants. Typically, the solvent is added or contacted with the clay or modified clay prior to the addition of the surfactant and the guar to make the full formulation.

Generally, performance of the suspension composition or polysaccharide slurry is measured by the following criteria: 1) less than about 1% volume settled in about 24 hrs, and/or 2) good hydration profile (greater than about 90% of full viscosity in less than about 10 min).

The present invention comprises in one aspect, suspension composition comprising: a carrier; an activator solvent comprising at least one ester of a diacid or a derivative thereof; an organo clay compound; and, optionally, a surfactant; wherein the carrier, the activator solvent, the organo clay compound and, optionally, the surfactant are present in the suspension composition in an amount effective to form a stable suspension capable of suspending polysaccharide particles.

The suspension composition can further comprise an acid component. In some embodiments, the acid component comprises fumaric acid. In other embodiments the acid component can be fumaric acid, adipic acid, maleic acid, malic acid, or any other acid that can lower pH for hydration.

In one embodiment, the carrier is present in the suspension in an amount ranging from about 25 to about 99 wt %, the activator solvent is present in an amount ranging from about 0.1 to about 10 wt %, the organo clay compound is present in an amount ranging from about 1 to about 10 wt %, and the surfactant is present in an amount ranging from about 0.1 to about 5 wt % based on the total weight of the suspension composition.

In another embodiment, the carrier is present in the suspension in an amount ranging from about 50 to about 99 wt %, the activator solvent is present in an amount ranging from about 0.1 to about 5 wt %, the organo clay compound is present in an amount ranging from about 1 to about 5 wt %, and the surfactant is present in an amount ranging from about 0.1 to about 3 wt % based on the total weight of the suspension composition.

In another embodiment, the carrier comprises mineral oil.

The organo clay compound is intended to mean those clays which have been modified, which in one embodiment means treated to alter of affect the surface properties of the clay (e.g. "hydrophobic" modification). The organo clay compound can include but is not limited to: modified bentonite, modified attapulgite, modified kaolinite, modified halloysite, modified chlorite, modified vermiculite, modified smectite, modified montmorillonite, modified hectorite, or any mixture thereof. Typically, the organo clay compound comprises modified bentonite, modified hydrophobically modified bentonite or a mixture thereof.

In one embodiment, the surfactant comprises at least one nonionic surfactant, for example an alcohol ethoxylate, an alkyl phenol ethoxylate, a terpene alkoxylate, or any mixture thereof.

It is understood that the suspension compositions and slurries described herein can comprise additional components that are typically used in oil field applications such as biocides, stabilizers, and the like, depending on the particular application.

The at least one dibasic methyl or ethyl ester can comprises at least two of: dialkyl methylglutarate, dialkyl ethylsuccinate, dialkyl adipate, dialkyl succinate or dialkyl glutarate, wherein dialkyl is dimethyl or diethyl. In another embodiment, the at least one dibasic ester comprises a blend of dialkyl methylglutarate, dialkyl ethylsuccinate and, optionally, dialkyl adipate. In a further embodiment, the at least one dibasic ester comprises a blend of dialkyl adipate, dialkyl succinate and dialkyl glutarate.

In one embodiment, the activator solvent comprises:

a) at least one dibasic ester selected from dialkyl methylglutarate, dialkyl ethylsuccinate, dialkyl adipate, dialkyl succinate or dialkyl glutarate;

b) at least one compound of formula (IIa):

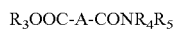

$R_3OOC-A-CONR_4R_5$     (IIa), wherein $R_3$ comprises a $C_1$-$C_{36}$ alkyl group; wherein $R_4$ and $R_5$ individually comprise a $C_1$-$C_{36}$ alkyl group, wherein $R_4$ and $R_5$ can optionally together form a ring; and wherein A is a linear or branched divalent $C_2$-$C_6$ alkyl group; or c) any combination thereof.

In one particular embodiment, the dibasic ester is a blend comprising:

(i) a first dibasic ester of formula:

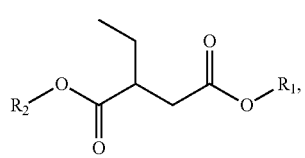

(I)

(ii) a second dibasic ester of formula:

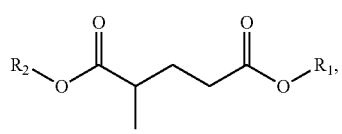

(II)

and (iii) optionally, a third dibasic ester of formula:

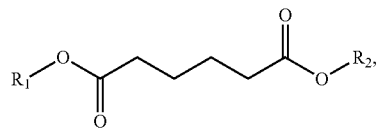

(III)

wherein $R_1$ and $R_2$ individually comprise a methyl or ethyl group.

In yet another aspect, described herein are polysaccharide slurry compositions comprising: polysaccharide particles; a carrier; an activator solvent comprising at least one ester of a diacid or a derivative thereof; an organo clay compound; and, optionally, a surfactant; wherein the polysaccharide particles, the carrier, the activator solvent, the organo clay compound and, optionally, the surfactant form a stable suspension of polysaccharide particles. In one embodiment, the polysaccharide particles comprises guar gum, a derivatized guar or a combination thereof.

In yet another aspect, described herein are methods for preparing a stable slurry composition comprising: —obtaining a suspension composition; and—contacting the suspension composition with polysaccharide particles. The suspension composition comprises: a carrier; an activator solvent comprising at least one diester solvent, at least one ester of a diacid or a derivative thereof; an organo clay compound; and, optionally, a surfactant; wherein the carrier, the activator solvent, the organo clay compound and, optionally, the surfactant are present in the suspension composition in an amount effective to form a stable suspension capable of suspending polysaccharide particles.

In a further aspect, described herein are methods for preparing a stable slurry compositions comprising: —obtaining a carrier; —contacting an organo clay compound with the carrier; —contacting an activator solvent comprising at least one diester solvent, at least one ester of a diacid or a derivative thereof with the carrier; —optionally, contacting at least one surfactant with the carrier; and—contacting polysaccharide particles with the carrier; wherein the polysaccharide particles, the carrier, the activator solvent, the organo clay compound and, optionally, the surfactant form a stable polysaccharide.

DETAILED DESCRIPTION

As used herein, the term "alkyl" means a saturated straight chain, branched chain, or cyclic hydrocarbon radical, including but not limited to, methyl, ethyl, n-propyl, iso-propyl, n-butyl, sec-butyl, t-butyl, pentyl, n-hexyl, and cyclohexyl.

As used herein, the term "aryl" means a monovalent unsaturated hydrocarbon radical containing one or more six-membered carbon rings in which the unsaturation may be represented by three conjugated double bonds, which may be substituted one or more of carbons of the ring with hydroxy, alkyl, alkenyl, halo, haloalkyl, or amino, including but not limited to, phenoxy, phenyl, methylphenyl, dimethylphenyl, trimethylphenyl, chlorophenyl, trichloromethylphenyl, aminophenyl, and tristyrylphenyl.

As used herein, the term "alkylene" means a divalent saturated straight or branched chain hydrocarbon radical, such as for example, methylene, dimethylene, trimethylene.

As used herein, the terminology "($C_r$—$C_s$)" in reference to an organic group, wherein r and s are each integers, indicates that the group may contain from r carbon atoms to s carbon atoms per group.

As used herein, the terminology "surfactant" means a compound that when dissolved in an aqueous medium lowers the surface tension of the aqueous medium.

In one embodiment, the activator solvent system is chosen from one or more of the following components, below. In another embodiment, the solvent is chosen from at least one component (or blends thereof) of the following:
a) at least one dibasic ester;
b) at least one compound of formula (IIa): $R_3OOC-A-CONR_4R_5$ (IIa), wherein $R_3$ comprises a $C_1$-$C_{36}$ alkyl group; wherein $R_4$ and $R_5$ individually comprise a $C_1$-$C_{36}$ alkyl group, wherein $R_4$ and $R_5$ can optionally together form a ring; and wherein A is a linear or branched divalent $C_2$-$C_6$ alkyl group. Preferably $R_3$, $R_4$, and $R_5$ are each methyl or ethyl.

In one embodiment, the activator solvent comprises (i) one or a (ii) blend of dibasic esters. In one embodiment, the blend comprises adducts of alcohol and linear diacids, the adducts having the formula $R_1$—OOC-A-COO—$R_2$ wherein $R_1$ and/or $R_2$ comprise, individually, methyl or ethyl.

In one embodiment, the blend comprises adducts of alcohol and branched or linear diacids, the adducts having the formula $R_1$—OOC-A-COO—$R_2$ wherein $R_1$ and/or $R_2$ comprise, individually, methyl or ethyl, and A comprises a mixture of —$(CH_2)_{4-3}$—$CH_2CH_2CH(CH_3)$—, and —$CH_2CH(C_2H_5)$—. It is understood that the acid portion may be derived from such dibasic acids such as adipic, succinic, glutaric, oxalic, malonic, pimelic, suberic and azelaic acids, as well as mixtures thereof.

The dibasic esters can be obtained by a process comprising an "esterification" stage by reaction of a diacid of formula HOOC-A-COOH or of a diester of formula MeOOC-A-COOMe with a branched alcohol or a mixture of alcohols. The reactions can be appropriately catalyzed. Use is preferably made of at least 2 molar equivalents of alcohols per diacid or diester. The reactions can, if appropriate, be promoted by extraction of the reaction by-products and followed by stages of filtration and/or of purification, for example by distillation.

The diacids in the form of mixtures can in particular be obtained from a mixture of dinitrile compounds in particular produced and recovered in the process for the manufacture of adiponitrile by double hydrocyanation of butadiene. This process, used on a large scale industrially to produce the greater majority of the adiponitrile consumed worldwide, is described in numerous patents and works. The reaction for the hydrocyanation of butadiene results predominantly in the formulation of linear dinitriles but also in formation of branched dinitriles, the two main ones of which are methylglutaronitrile and ethylsuccinonitrile. The branched dinitrile compounds are separated by distillation and recovered, for example, as top fraction in a distillation column, in the stages for separation and purification of the adiponitrile. The branched dinitriles can subsequently be converted to diacids or diesters (either to light diesters, for a subsequent transesterification reaction with the alcohol or the mixture of alcohols or the fusel oil, or directly to diesters in accordance with the invention).

Dibasic esters of the present invention may be derived from one or more by-products in the production of polyamide, for example, polyamide 6,6. In one embodiment, the at least one dibasic ester comprises a blend of linear or branched, cyclic or noncyclic, $C_1$-$C_{20}$ alkyl, aryl, alkylaryl or arylalkyl esters of adipic diacids, glutaric diacids, and succinic diacids. In another embodiment, the composition comprises a blend of linear or branched methyl or ethyl esters of adipic diacids, methylglutaric diacids, and ethylsuccinic diacids.

Generally, polyamide is a copolymer prepared by a condensation reaction formed by reacting a diamine and a dicarboxylic acid. Specifically, polyamide 6,6 is a copolymer prepared by a condensation reaction formed by reacting a diamine, typically hexamethylenediamine, with a dicarboxylic acid, typically adipic acid.

In one embodiment, the blend of dibasic esters can be derived from one or more by-products in the reaction, synthesis and/or production of adipic acid utilized in the production of polyamide, the composition comprising a blend of dialkyl esters of adipic diacids, glutaric diacids, and succinic diacids (herein referred to sometimes as "AGS" or the "AGS blend").

In one embodiment, the blend of esters is derived from by-products in the reaction, synthesis and/or production of hexamethylenediamine utilized in the production of polyamide, typically polyamide 6,6. The composition comprises a blend of dialkyl esters of adipic diacids, methylglutaric diacids, and ethylsuccinic diacids (herein referred to sometimes as "MGA", "MGN", "MGN blend" or "MGA blend").

In certain embodiments, the dibasic ester blend comprises:
a diester of formula I:

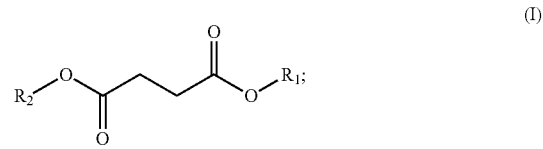

a diester of formula II:

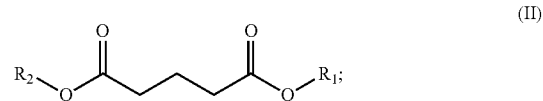

and
a diester of formula III:

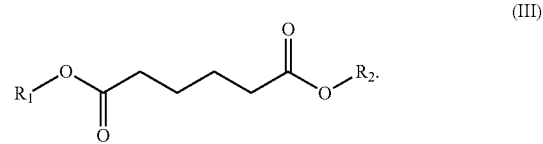

$R_1$ and/or $R_2$ can individually comprise a hydrocarbon having from about 1 to about 8 carbon atoms, typically, methyl, ethyl, propyl, isopropyl, butyl, isobutyl, n-butyl, isoamyl, hexyl, heptyl or octyl. In such embodiments, the blend typically comprises (by weight of the blend) (i) about 15% to about 35% of the diester of formula I, (ii) about 55% to about 70% of the diester of formula II, and (iii) about 7% to about 20% of the diester of formula III, and more typically, (i) about 20% to about 28% of the diester of formula I, (ii) about 59% to about 67% of the diester of formula II, and (iii) about 9% to about 17% of the diester of formula III. The blend is generally characterized by a flash point of 98° C., a vapor pressure at 20° C. of less than about 10 Pa, and a distillation temperature range of about 200-300° C.

In certain other embodiments, the dibasic ester blend comprises: a diester of the formula IV:

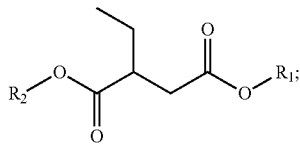
(IV)

a diester of the formula V:

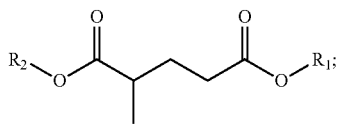
(V)

and, optionally, a diester of the formula VI:

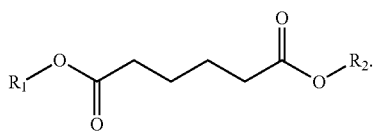
(VI)

$R_1$ and/or $R_2$ can individually comprise a hydrocarbon having from about 1 to about 8 carbon atoms, typically, methyl, ethyl, propyl, isopropyl, butyl, isobutyl, n-butyl, isoamyl, hexyl, heptyl, or octyl. In such embodiments, the blend typically comprises (by weight of the blend) (i) from about 5% to about 30% of the diester of formula IV, (ii) from about 70% to about 95% of the diester of formula V, and (iii) from about 0% to about 10% of the diester of formula VI. In one embodiment, ("Activator Solvent A"), the blend typically comprises (by weight of the blend): (i) from about 6% to about 12% of the diester of formula IV, (ii) from about 86% to about 92% of the diester of formula V, and (iii) from about 0.5% to about 4% of the diester of formula VI.

Most typically, the blend comprises (by weight of the blend): (i) about 9% of the diester of formula IV, (ii) about 89% of the diester of formula V, and (iii) about 1% of the diester of formula VI. The blend is generally characterized by a flash point of 98° C., a vapor pressure at 20° C. of less than about 10 Pa, and a distillation temperature range of about 200-275° C.

In another embodiment, the solvent can include other solvents, including but not limited to aliphatic or acyclic hydrocarbons solvents, halogenated solvents, aromatic hydrocarbon solvents, cyclic terpenes, unsaturated hydrocarbon solvents, halocarbon solvents, polyols, alcohols including short chain alcohols, ketones or mixtures thereof.

In one embodiment, a compound utilized as the activator solvent or as a component in the activator solvent blend is a compound of general formula (II):

$R_3OOC$-A-$CONR_4R_5$ (II),

According to one embodiment, the expression "compound" denotes any compound corresponding to the general formula (II). In other embodiments, the term "compound" also refers to mixtures of several molecules corresponding to general formula (II). It may therefore be a molecule of formula (II) or a mixture of several molecules of formula (II), wherein both fall under the definition of the term "compound" when referring to formula (II).

The $R_3$, $R_4$ and $R_5$ groups can be, in some embodiments, identical or, in other embodiments, different. In one embodiment, may be groups chosen from $C_1$-$C_{20}$ alkyl, aryl, alkaryl or arylalkyl groups or the phenyl group. In another embodiment, may be groups chosen from $C_1$-$C_{12}$ alkyl, aryl, alkaryl or arylalkyl groups or the phenyl group. Mention is made especially of Activator Solvent B. The $R_4$ and $R_5$ groups may optionally be substituted. In one particular embodiment, the groups are substituted with hydroxyl groups.

In one embodiment, $R_3$ group is chosen from methyl, ethyl, propyl, isopropyl, n-butyl, isobutyl, n-pentyl, isopentyl, isoamyl, n-hexyl, cyclohexyl, 2-ethylbutyl, n-octyl, isooctyl, 2-ethylhexyl, tridecyl groups.

$R_4$ and $R_5$ groups, which are identical or different, in one embodiment, may especially be chosen from methyl, ethyl, propyl (n-propyl), isopropyl, n-butyl, isobutyl, n-pentyl, amyl, isoamyl, hexyl, cyclohexyl or hydroxyethyl groups. The $R_4$ and $R_5$ groups may also be such that they form, together with the nitrogen atom, a morpholine, piperazine or piperidine group. According to some embodiments, $R_4$ and $R_5$ are each methyl, or $R_4$ and $R_5$ are each ethyl, or $R_4$ and $R_5$ are each hydroxyethyl.

According to one embodiment, if A comprises a linear group of formula —$CH_2$—$CH_2$— and/or of formula —$CH_2$—$CH_2$—$CH_2$—$CH_2$— and/or of formula —$(CH_2)_8$— then it is a mixture of A groups. According to one particular embodiment, if A is linear, then it is a mixture of A groups, for example a mixture of two or three —$CH_2$—$CH_2$— (ethylene); —$CH_2$—$CH_2$—$CH_2$— (n-propylene); and —$CH_2$—$CH_2$—$CH_2$—$CH_2$— (n-butylene) groups (or isomers thereof).

According to a first particular embodiment of the invention, the A group is a divalent linear alkyl group chosen from the groups of the following formulae: —$CH_2$—$CH_2$— (ethylene); —$CH_2$—$CH_2$—$CH_2$— (n-propylene); —$CH_2$—$CH_2$—$CH_2$—$CH_2$— (n-butylene), and mixtures thereof.

According to such embodiment, the compound is a mixture according to the following mixture of molecules:

$R_3OOC$—$(CH_2)_2$—$CONR_4R_5$;

$R_3OOC$—$(CH_2)_3$—$CONR_4R_5$; and $R_3OOC$—$(CH_2)_4$—$CONR_4R_5$

According to another particular embodiment of the invention, the A group is a divalent branched alkyl group chosen from the groups of the following formulae: —$CH(CH_3)$—$CH_2$—$CH_2$—; —$CH(C_2H_5)$—$CH_2$—; and, optionally, —$CH_2$—$CH_2$—$CH_2$—$CH_2$—; as well as mixtures thereof.

According to such embodiment, the compound is a mixture according to the following mixture of molecules:

$R_3OOC$—$CH(CH_3)(CH_2)_2$—$CONR_4R_5$;

$R_3OOC$—$CH(C_2H_5)CH_2$—$CONR_4R_5$; and, optionally, $R_3OOC$—$(CH_2)_4$—$CONR_4R_5$ According to one particular variant in this first embodiment, the compound of the invention is chosen from the following compounds:

$MeOOC$—$CH_2$—$CH_2$—$CONMe_2$;

$MeOOC$—$CH_2$—$CH_2$—$CH_2$—$CONMe_2$;

MeOOC—CH$_2$—CH$_2$—CH$_2$—CONMe$_2$, as a mixture with MeOOC—CH$_2$—CH$_2$—CH$_2$—CH$_2$—CONMe$_2$ and/or with MeOOC—CH$_2$—CH$_2$—CONMe$_2$.

According to another embodiment of the invention, the A group is a divalent branched alkylene group having one of the following formulae (IIa), (IIb), (IIc), (IIIa) and (IIIb), or a mixture of at least two groups chosen from the groups of formulae (IIa), (IIb) and (IIc) or from the groups of formulae (IIIa) and (IIIb), or a mixture of at least two groups, one chosen from the groups of formulae (IIa), (IIb) and (IIc) and the others chosen from the groups of formulae (IIIa) and (IIIb):

—(CHR$_9$)$_y$—(CHR$_8$)$_x$—(CHR$_9$)$_z$—CH$_2$—CH$_2$—    (IIa)

—CH$_2$—CH$_2$—(CHR$_9$)$_z$—(CHR$_8$)$_x$—(CHR$_9$)$_y$—    (IIb)

—(CHR$_9$)$_z$—CH$_2$—(CHR$_8$)$_x$—CH$_2$—(CHR$_9$)$_y$—    (IIc)

—(CHR$_9$)$_y$—(CHR$_8$)$_x$—(CHR$_9$)$_z$—CH$_2$—    (IIIa)

—CH$_2$—(CHR$_9$)$_z$—(CHR$_8$)$_x$—(CHR$_9$)$_y$—    (IIIb)

where:
x is an integer greater than 0;
y is an average integer greater than or equal to 0;
z is an average integer greater than or equal to 0; R$_8$, which is identical or different, is a C$_1$-C$_6$, preferably C$_1$-C$_4$, alkyl group; and R$_9$, which is identical or different, is a hydrogen atom or a C$_1$-C$_6$, preferably C$_1$-C$_4$, alkyl group. In this particular embodiment, the A group is preferably a group such that y and z are 0.

In one embodiment, in formula (IIa) and/or in the formula (IIb): x is 1; y and z are 0; R$_8$ is methyl.

In another embodiment, in the formula (IIIa) and/or in the formula (IIIb): x is 1; y and z are 0; R$_8$ is ethyl.

According to another embodiment, the compound of the invention is chosen from the following compounds, and mixtures thereof:

MeOOC-A$_{MG}$-CONMe$_2$;

MeOOC-A$_{ES}$-CONMe$_2$;

PeOOC-A$_{MG}$-CONMe$_2$;

PeOOC-A$_{ES}$-CONMe$_2$;

CycloOOC-A$_{MG}$-CONMe$_2$;

CycloOOC-A$_{ES}$-CONMe$_2$;

EhOOC-A$_{MG}$-CONMe$_2$;

EhOOC-A$_{ES}$-CONMe$_2$;

PeOOC-A$_{MG}$-CONEt$_2$;

PeOOC-A$_{ES}$-CONEt$_2$;

CycloOOC-A$_{MG}$-CONEt$_2$;

CycloOOC-A$_{ES}$-CONEt$_2$;

BuOOC-A$_{MG}$-CONEt$_2$;

BuOOC-A$_{ES}$-CONEt$_2$;

BuOOC-A$_{MG}$-CONMe$_2$;

BuOOC-A$_{ES}$-CONMe$_2$;

EtBuOOC-A$_{MG}$-CONMe$_2$;

EtBuOOC-A$_{ES}$-CONMe$_2$;

n-HeOOC-A$_{MG}$-CONMe$_2$;

n-HeOOC-A$_{ES}$-CONMe$_2$;

where A$_{MG}$ represents an MG$_a$ group of formula —CH(CH$_3$)—CH$_2$—CH$_2$—, or MG$_b$ group of formula —CH$_2$—CH$_2$—CH(CH$_3$)— or a mixture of MG$_a$ and MG$_b$ groups;
A$_{ES}$ represents an ES$_a$ group of formula —CH(C$_2$H$_5$)—CH$_2$—, or ES$_b$ group of formula —CH$_2$—CH(C$_2$H$_5$)— or a mixture of ES$_a$ and ES$_b$ groups;
Pe represents a pentyl group, preferably an isopentyl or isoamyl group;
Cyclo represents a cyclohexyl group;
Eh represents a 2-ethylhexyl group;
Bu represents a butyl group, preferably an n-butyl or tert-butyl group;
EtBu represents an ethylbutyl group; and
n-He represents an n-hexyl group.

It is mentioned that according to one particular embodiment (Activator Solvent B), the activator solvent is a mixture of about 6-12% by weight MeOOC—CHEt-CH$_2$—CONMe$_2$; about 86-92% by weight MeOOC—CH(CH$_3$)—(CH$_2$)$_2$—CONMe$_2$; and about 0.5-4% by weight MeOOC—CH$_2$—CH$_2$—CH$_2$—CH$_2$—CONMe$_2$ It is mentioned that according to even more particular variant of one or the other of the particular embodiments of the invention, the compound of the invention is a novel compound of the invention, different from the following compounds or mixtures, if the latter, individually, are not used as a mixture with other compounds corresponding to formula (II):

MeOOC—CHEt-CH$_2$—CONMe$_2$;

MeOOC—CH$_2$—CH(CH$_3$)—CH$_2$—CONMe$_2$;

MeOOC—CH$_2$—CH$_2$—CH$_2$—CONMe$_2$;

MeOOC—CH$_2$—CH$_2$—CONMe$_2$;

mixture of PhOOC—CH(CH$_3$)—CH$_2$—CONEt$_2$ and PhOOC—CH$_2$—CH$_2$—CH$_2$—CONEt$_2$;

EtOOC—CH(CH$_3$)—CH$_2$—CONEt$_2$;

MeOOC—CH(CH$_3$)—CH$_2$—CONEt$_2$;

Me-CH(OMe)-OOO—CH(CH$_3$)—CH$_2$—CONEt$_2$;

Cyclohexyl-OOO—CH(CH$_3$)—CH$_2$—CONEt$_2$;

Ph-CH$_2$—OOC—CH(CH$_3$)—CH$_2$—CONEt$_2$;

p-cresyl-OOO—CH(CH$_3$)—CH$_2$—CONEt$_2$;

mixture of EtOOC—CHEt-CH$_2$—CONEt$_2$, EtOOC—CH(CH$_3$)—CH$_2$—CH$_2$—CONEt$_2$ and EtOOC—CH$_2$—CH$_2$—CH$_2$—CH$_2$—CONEt$_2$; and MeOOC—CH$_2$—CH(CH$_3$)—CH$_2$—CONH(n-butyl).

It is mentioned that according to one even more particular variant of one or the other of the particular embodiments of the invention, the compound of the invention is a novel compound of the invention, different from the following compounds or mixtures, if the latter, individually, are not used as a mixture with other compounds corresponding to formula (II):

$C_4H_9$—OOC—$CH_2$—$CH_2$—CON $Et_2$ $C_6H_{13}$—OOC—$(CH_2)_8$—CON$(C_3H_7)_2$ $C_8H_{17}$—OOC—$(CH_2)_8$—CON$(C_4H_9)_2$ $C_8H_{17}$—OOC—$(CH_2)_8$—CON$(C_8H_{17})_2$.

In one embodiment, it is possible to use the following compounds as a mixture with other compounds corresponding to formula (II):

MeOOC—CHEt-$CH_2$—$CONMe_2$;

MeOOC—$CH_2$—CH($CH_3$)—$CH_2$—$CONMe_2$;

MeOOC—$CH_2$—$CH_2$—$CH_2$—$CONMe_2$;

MeOOC—$CH_2$—$CH_2$—$CONMe_2$;

mixture of PhOOC—CH($CH_3$)—$CH_2$—$CONEt_2$ and PhOOC—$CH_2$—$CH_2$—$CH_2$—$CONEt_2$;

EtOOC—CH($CH_3$)—$CH_2$—$CONEt_2$;

MeOOC—CH($CH_3$)—$CH_2$—$CONEt_2$;

Me-CH(OMe)-OOO—CH($CH_3$)—$CH_2$—$CONEt_2$;

Cyclohexyl-OOO—CH($CH_3$)—$CH_2$—$CONEt_2$;

Ph-$CH_2$OOC—CH($CH_3$)—$CH_2$—$CONEt_2$;

p-cresyl-OOO—CH($CH_3$)—$CH_2$—$CONEt_2$;

mixture of EtOOC—CHEt-$CH_2$—$CONEt_2$, EtOOC—CH($CH_3$)—$CH_2$—$CH_2$—$CONEt_2$ and EtOOC—$CH_2$—$CH_2$—$CH_2$—$CH_2$—$CONEt_2$;

MeOOC—$CH_2$—CH($CH_3$)—$CH_2$—CONH(n-butyl);

$C_4H_9$—OOC—$CH_2$—$CH_2$—CON $Et_2$;

$C_6H_{13}$—OOC—$(CH_2)_8$—CON$(C_3H_7)_2$;

$C_8H_{17}$—OOC—$(CH_2)_8$—CON$(C_4H_9)_2$; and $C_8H_{17}$—OOC—$(CH_2)_8$—CON$(C_8H_{17})_2$.

It is mentioned that according to one still more particular variant of one or the other of the particular embodiments of the invention, the following compounds or mixtures are not used:

MeOOC—CHEt-$CH_2$—$CONMe_2$;

MeOOC—$CH_2$—CH($CH_3$)—$CH_2$—$CONMe_2$;

MeOOC—$CH_2$—$CH_2$—$CH_2$—$CONMe_2$;

MeOOC—$CH_2$—$CH_2$—$CONMe_2$;

mixture of PhOOC—CH($CH_3$)—$CH_2$—$CONEt_2$ and PhOOC—$CH_2$—$CH_2$—$CH_2$—$CONEt_2$;

EtOOC—CH($CH_3$)—$CH_2$—$CONEt_2$;

MeOOC—CH($CH_3$)—$CH_2$—$CONEt_2$;

Me-CH(OMe)-OOO—CH($CH_3$)—$CH_2$—$CONEt_2$;

Cyclohexyl-OOO—CH($CH_3$)—$CH_2$—$CONEt_2$;

Ph-$CH_2$OOC—CH($CH_3$)—$CH_2$—$CONEt_2$;

p-cresyl-OOO—CH($CH_3$)—$CH_2$—$CONEt_2$;

mixture of EtOOC—CHEt-$CH_2$—$CONEt_2$, EtOOC—CH($CH_3$)—$CH_2$—$CH_2$—$CONEt_2$ and EtOOC—$CH_2$—$CH_2$—$CH_2$—$CH_2$—$CONEt_2$; and MeOOC—$CH_2$—CH($CH_3$)—$CH_2$—CONH(n-butyl).

It is mentioned that according to one still more particular variant of one or the other of the particular embodiments of the invention, the following compounds or mixtures are not used:

$C_4H_9$—OOC—$CH_2$—$CH_2$—CON $Et_2$;

$O_6H_{13}$—OOC—$(OH_2)_8$—CON$(O_3H_7)_2$;

$C_8H_{17}$—OOC—$(CH_2)_8$—CON$(C_4H_9)_2$;

$C_8H_{17}$—OOC—$(CH_2)_8$—CON$(C_8H_{17})_2$.

According to one embodiment, the ester amide has a melting point that is less than or equal to 20° C., preferably 5° C., preferably OOC.

In one particular embodiment, $R_3$ is a group chosen from saturated or unsaturated, linear or branched, optionally cyclic, optionally aromatic hydrocarbon-based groups comprising an average number of carbon atoms ranging from 1 to 36. $R_4$ and $R_5$, which are identical or different, are groups chosen from saturated or unsaturated, linear or branched, optionally cyclic, optionally aromatic, optionally substituted hydrocarbon-based groups comprising an average number of carbon atoms ranging from 1 to 36. It is possible for $R_4$ and $R_5$ to form a ring together, and in some embodiment, the ring is optionally substituted and/or optionally comprises a heteroatom. In some embodiments, A is a linear or branched divalent alkyl group comprising an average number of carbon atoms ranging from 1 to 20, in some embodiments, from 2 to 12, in other embodiments, from 2 to 8, in yet other embodiments, from 2 to 4.

In another embodiment, the solvent system can contain one or more surfactants. The surfactant can be any number of cationic, amphoteric, zwitterionic, anionic or nonionic surfactants, derivatives thereof, as well as blends of such surfactants.

In one embodiment, the nonionic surfactants generally includes one or more of for example amides such as alkanolamides, ethoxylated alkanolamides, ethylene bisamides; esters such as fatty acid esters, glycerol esters, ethoxylated fatty acid esters, sorbitan esters, ethoxylated sorbitan; ethoxylates such as alkylphenol ethoxylates, alcohol ethoxylates, tristyrylphenol ethoxylates, mercaptan ethoxylates; end-capped and EO/PO block copolymers such as ethylene oxide/propylene oxide block copolymers, chlorine capped ethoxylates, tetra-functional block copolymers; amine oxides such lauramine oxide, cocamine oxide, stearamine oxide, stearamidopropylamine oxide, palmitamidopropylamine oxide, decylamine oxide; fatty alcohols such as decyl alcohol, lauryl alcohol, tridecyl alcohol, myristyl alcohol, cetyl alcohol, stearyl alcohol, oleyl alcohol, linoleyl alcohol and linolenyl alcohol; and alkoxylated alcohols such as ethoxylated lauryl alcohol, trideceth alcohols; and fatty acids such as lauric acid, oleic acid, stearic acid, myristic acid, cetearic acid, isostearic acid, linoleic acid, linolenic acid, ricinoleic acid, elaidic acid, arichidonic acid, myristoleic acid, as well as mixtures thereof. In another embodiment, the non-ionic surfactant is a glycol such as polyethylene glycol (PEG), alkyl PEG esters, polypropylene glycol (PPG) and derivatives thereof. In certain embodiments, the surfactant is a blend of:

one or more alcohol ethoxylates, one or more alkyl phenol ethoxylates, one or more terpene alkoxylates, or any mixture thereof. In one exemplary embodiment, the surfactant is a $C_6$-$C_{13}$ alcohol ethoxylate and, more typically, a $C_8$-$C_{12}$ alcohol ethoxylate.

Suitable polysaccharide include but are not limited to galactomannan polymers, guar gum, derivatized guar, starch, dextrins, chitin/chitosan, alginate compositions, cassia gum, tara gum, xanthan gum, locust beam gum, carrageenan gum, gum karaya, gum arabic, hyaluronic acids, succinoglycan, pectin, crystalline polysaccharides, branched polysaccharide, cellulose, as well as ionic and/or non-ionic derivatives of the foregoing or other derivates of any of the foregoing.

In one embodiment, the derivatized guar can include but is not limited to cationic hydroxpropyl guar, hydroxyalkyl guar, including hydroxyethyl guar (HE guar), hydroxypropyl guar (HP guar), hydroxybutyl guar (HB guar) and higher hydroxylalkyl guars, carboxylalkyl guars, including carboxymethyl guar (CM guar), carboxylpropyl guar (CP guar), carboxybutyl guar (CB guar), and higher alkyl carboxy guars, guar hydroxypropyltrimonium chloride, or hydroxypropyl guar hydroxypropyltrimonium chloride. In one particular embodiment, derivatized guars include but are not limited to carboxymethyl guar (CM guar), hydroxyethyl guar (HE guar), hydroxypropyl guar (HP guar), carboxymethylhydroxypropyl guar (CMHP guar), cationic guar, hydrophobically modified guar (HM guar), hydrophobically modified carboxymethyl guar (HMCM guar), hydrophobically modified hydroxyethyl guar (HMHE guar), hydrophobically modified hydroxypropyl guar (HMHP guar), cationic hydrophobically modified hydroxypropyl guar (cationic HMHP guar), hydrophobically modified carboxymethylhydroxypropyl guar (HMCMHP guar) and hydrophobically modified cationic guar (HM cationic guar).

In some embodiments, blending of the selected ingredients for forming the suspension composition can be carried out in any manner but generally the selected ingredients are added to the carrier, which is typically mineral oil. Following the addition of the clay component to the carrier, typically the activator solvent is added at a high shear rate to permit the clay component to develop viscosity. Then, in some embodiments, optionally surfactants or other components such as fumaric acid can be added to complete the suspension composition to which the polysaccharide particles are then added under agitation to form the desired stable slurry.

EXAMPLES

In the following examples * represents "Comparative" A typical native guar slurry formulation as set forth in Table 1 was used.

TABLE 1

TYPICAL NATIVE GUAR SLURRY FORMULATION

| Component | Weight (%) |
|---|---|
| Mineral oil | 52 |
| Hydrophobic Clay | approx. 2 |
| Activator solvent | approx. 1 |
| Surfactant | 0.4 |
| High Viscosity Native Guar | 46 |

The clay is approx. 2%, and the activator solvent is approx. 1% of the mineral oil composition.

Example 1

To test the efficiency of the activator solvent in dispersing clay, hydrophobically modified clay (Bentone 140, approx. 2%) was added to mineral oil with various activator solvents (approx. 1%). The clay was stirred with a small stir bar overnight (without high shear mixing) to investigate the efficiency of the chemistry in breaking up the hydrophobically modified clay galleries. The resulting dispersion was allowed to settle/sediment over time up to 48 h and the amount of settling of the clay dispersion was measured and shown in Table 2.

Table 2.

Extent of Settling of 2% hydrophobically modified clay (Bentone 140) dispersion in mineral oil with different activator solvents added (1%). The extent of setting is expressed as % change in volume occupied by the clay.

TABLE 2

Low shear mixing with stir bar-Extent of Settling over Time

Activator solvents in Mineral Oil

| Time | Activator Solvent B | Activator Solvent A | IPA* | EGMBE* | DIB* | None* |
|---|---|---|---|---|---|---|
| 30 min | 0.0% | −9.1% | −41.3% | −13.0% | −78.3% | −86.4% |
| 45 min | 0.0% | −18.2% | −50.0% | −22.7% | −78.3% | −86.4% |
| 60 min | 0.0% | −22.7% | −50.0% | −27.3% | −81.8% | −86.4% |
| 24 h | 0.0% | −40.9% | −54.5% | −45.5% | −81.8% | −86.4% |
| 48 h | 0.0% | −45.5% | −54.5% | −45.5% | −81.8% | −86.4% |

"IPA*" is isopropyl alcohol used in the prior art. The settling time is the fastest, i.e., the worst, with clay and no activator (labeled "mineral oil") and with added DIB (non-polar diisobutyl ester of linear dibasic acids). In this example, the following order of stability was observed: Activator Solvent B > Activator Solvent A > EGMBE *> IPA*. Activator Solvent B is an ester-amide or diamide. Activator Solvent A is a blend of dibasic esters, of which a branched dibasic ester comprises the majority of the blend. The Activator Solvent B-activated clay forms a weak gel with a yield stress, and is stable as a homogeneous dispersion over several weeks.

Example 2

To test the efficiency of "activator" solvents in stabilizing pre-dispersed clay a pre-gel of modified clay Bentone 155 was made in mineral oil with a high shear Ross Mixer (15 min). The activator solvents (1% w/w) were then stirred overnight and allowed to sediment over time as shown in Table 2A. Clay in mineral oil with no additive settled the fastest (35% in 4 h) compared to PnB or EGMBE. Activator Solvent A was found to be more efficient in stabilizing hydrophobically modified clay (Bentone 155) than PnB* or EGMBE*.

TABLE 2A

High Shear mixing with Ross mixer: Extent of Settling of 2% hydrophobically modified clay (Bentone 155) dispersion in mineral oil in time with different activator solvents added (1%). The extent of setting is expressed as Δ % change in volume occupied by the clay

| Time (h) | Mineral Oil (Δ %) Settling | Activator Solvent A (Δ %) Settling | EGMBE* (Δ %) Settling | PnB* (Δ %) Settling |
|---|---|---|---|---|
| 1.00 | 9.76 | 2.50 | 2.44 | 2.44 |
| 1.50 | 15.38 | 2.70 | 3.95 | 5.26 |
| 3.00 | 27.27 | 4.88 | 7.14 | 13.95 |
| 4.00 | 34.09 | 9.76 | 12.20 | 20.93 |

Example 3

Carboxymethyl Guar (CM guar) slurries are usually more difficult to prepare compared to native guar (NG) slurries with greater stability issues. To a clay (Bentone 155) pre-gel prepared in a high shear Ross mixer (15 min) with activator solvents, a requisite amount of CM guar (as shown in Table 3) was added and mixed with an overhead stirrer for 30 min at approx. 1200 rpm and allowed to sediment for 24 hrs. No Fumaric acid or surfactant were added at this stage.

TABLE 3

Formulations for 4 lb/gal Carboxymethyl Guar slurries (including fumaric acid) which helps in hydration of carboxylated guars

| Component | Weight (%) |
|---|---|
| Mineral oil | 52 |
| Hydrophobic Clay | 0.5-2 |
| Activator solvent | 0.1-2 |
| Surfactant | 0.4 |
| Carboxymethyl Guar | 46 |
| Fumaric Acid | 0-1 |

No surfactant or additional additives such as fumaric acid were added at this stage to the formulation as shown in Table 3. The extent of settling is expressed as (A) a percentage change in volume occupied by the guar particles. Referring to Table 4, it has been observed that PnB* and EGMBE* based on Carboxymethyl Guar slurries were more unstable compared to slurries with Activator Solvent A when allowed to sediment over 24 hrs. The comparison below is for the same processing conditions suggesting that Activator Solvent A may provide improved processability (reduced batch mixing times) compared to glycol ethers.

TABLE 4

Extent of settling (Δ %) of 4 lb/gal CMG slurries prepared by adding guar to Bentone 155 pregel in mineral oil with different activator solvents. No added surfactant or Fumaric acid

| Activator Solvents | Δ = % Settling by volume |
|---|---|
| PnB* | −7% |
| EGMBE* | −21% |
| Activator Solvent A | −3% |

Example 4

Effect of Added Surfactant 4 lb/gal Carboxymethyl Guar slurries (CMG) were prepared with Activator Solvent A using the process as outlined below and in the proportions as outlined in Table 3. The surfactant used is an alcohol ethoxylate nonionic.

A. Make pregel
1. Bentone 155 in Mineral oil Ross mixer (5 min)
2. Added Activator Solvent A, Ross Mix 15 min.

B. Added different amounts surfactant (0%, 50% and 100% of full formulation amount) to pregel (mix 10 min, 600 rpm)

C. Add Carboxymethyl Guar at 600 rpm (then mix 30 min@1200 rpm)

D. Add Fumaric Acid (Mix 110 min @ 1200 rpm)

The mixed slurries were then allowed to equilibrate for 24 hrs and the extent of settling was observed as shown in Table 5 below.

TABLE 5

Extent of settling (Δ %) of 4 lb/gal CMG slurries with Activator Solvent A as activator solvent, fumaric acid, and different levels of added surfactants

| Surfactant Added (% of required formulation amount as defined in Table 3) | Δ = % Settling by volume with Activator Solvent A as activator at 24 h |
|---|---|
| 0% | 0% |
| 50% | −0.5% |
| 100% | −1% |

The slurries were found to be acceptably stable after 24 hrs for all surfactant levels. The slurries were found to be free flowing at all surfactant levels.

Example 5

4 lb/gal Carboxymethyl Guar Slurry Prepared with PnB

The effect of additive surfactant and processing conditions was then tested with PnB as the activator solvent to make slurries with composition as outlined in Table 3. Table 6 below shows the slurry stability with different levels of surfactant using the process similar to Example 4.

Process:
Make Pregel
1) Bentone 155 in Mineral oil Ross mixer (5 min)
2) Added Activator Solvent A, Ross Mix 15 min.

Added different amounts surfactant (0%, 50%, and 100% of formulation amount as shown in Table 3) (mix 10 min, 600 rpm)

Add Carboxymethyl Guar at 600 rpm (then mix 30 min@1200 rpm)

Add Fumaric Acid (Mix 110 min @ 1200 rpm)

TABLE 6

Extent of settling (able 6. Extent of settling (200 ramount as shown in Table 3) s then teActivator Solvent A, with added fumaric acid, and different levels of added surfactants

| Surfactant Added (% of required formulation amount as defined in Table 3) | Δ = % Settling by volume with Activator Solvent A as activator | Δ = % Settling by volume with PnB* as activator at 24 h | Comment |
|---|---|---|---|
| 0% | 0% | −3% | VERY VISCOUS GEL |
| 50% | −0.5% | −3% | VISCOUS |
| 100% | −1% | −1% | Flowable |

We found that the PnB activated Carboxymethyl Guar slurry without surfactant became a viscous thick gel. The slurry with adequate surfactant concentration was flowable and met the performance criterion of 1% separation in 24 hrs, while the slurries with PnB and reduced surfactant levels did not. The additive surfactant therefore serves to reduce the viscosity of the slurry and serves as a processing aid. In contrast, as mentioned above the viscosity of Activator Solvent A activated slurries was fluid/reasonable and free flowing at all surfactant levels.

Example 6

4 lb/gal Carboxymethyl Guar Slurry Prepared with EGMBE

The effect of additive surfactant and processing conditions was then tested with EGMBE as the activator solvent to make slurries with composition as outlined in Table 3. Table 7 below shows the slurry stability with different levels of surfactant using the process similar to Example 4.

Process:
Make Pregel
3) Bentone 155 in Mineral oil Ross mixer (5 min)
4) Added Activator Solvent A, Ross Mix 15 min.
Added different amounts surfactant (mix 10 min, 600 rpm)
Add Carboxymethyl Guar at 600 rpm (then mix 30 min@1200 rpm)
Add Fumaric Acid (Mix 20 min @ 1200 rpm)

TABLE 7

Extent of settling (Δ %) Activator Solvent A, with added fumaric acid, and different levels of added surfactants

| Surfactant Added (% of required formulation amount as defined in Table 3) | Δ = % Settling by volume with Activator Solvent A as activator | Δ = % Settling by volume with EGMBE* as activator at 24 h | Comment |
|---|---|---|---|
| 0% | 0% | −2% | VERY VISCOUS GEL |
| 50% | −0.5% | −6% | VISCOUS |
| 100% | −1% | −2% | Flowable |

We found that the EGMBE activated Carboxymethyl Guar slurry without surfactant became a viscous thick gel. The slurry with adequate surfactant concentration was flowable but none of the EGMBE* slurries prepared under the identical mixing conditions met performance criterion of less than Δ>−1% separation in 24 hrs (right panel, Figure 8). The processing conditions for preparing the EGMBE* slurries would be therefore more rigorous than those with Activator Solvent A. In contrast, as mentioned above the viscosity of Activator Solvent A activated slurries was reasonable and free flowing at all surfactant levels.

Example 7

Hydration of Carboxymethyl Guar slurries with Activator Solvent A as activator. The effect of surfactant concentration on the hydration of the guar slurries prepared in example 6 was conducted using the protocol as described below.
2.5 mL of slurry in 255 g 2% KCl water
Mix at 2500 rpm for 2.5 minutes
Measure evolution of viscosity at 300 rpm over time
The hydration rates of the slurry were not impacted by addition of Activator Solvent A (similar hydration viscosities measured) at 0%, 50%, and 100% of surfactant added. The surfactant is therefore not necessary for the hydration of the guar.

Example 8

HIGH Concentration 5/lb/gal Slurries 5 lb/gal Carboxymethyl Guar slurries (CMG) were prepared with Activator Solvent A by simply adding extra guar using the process as outlined below and in the proportions as outlined in Table 8 below. The surfactant used is the alcohol ethoxylate nonionic.

Process:
A. Make Pregel
1. Bentone 155 in Mineral oil Ross mixer (5 min)
2. Added Activator Solvent A, Ross Mix 15 min.
B. Added different amounts surfactant (0%, 50% and 100% of full formulation amount) to pregel (mix 10 min, 600 rpm)
C. Add Carboxymethyl Guar at 600 rpm (then mix 30 min@1200 rpm)
D. Add Fumaric Acid (Mix 110 min @ 1200 rpm)

TABLE 8

Formulations for 5 lb/gal Carboxymethyl Guar slurry (including fumaric acid) by simply adding extra guar to formulation in Table 3 (Full clay Bentone 155 levels)

| Component | Weight (%) |
|---|---|
| Mineral oil | 42 |
| Hydrophobic Clay | 1 |
| Activator solvent | 0.1-2 |
| Surfactant | 0.4 |
| Carboxymethyl Guar | 56 |
| Fumaric Acid | 0-1 |

The slurry prepared as per the formulation in Table 8 was very viscous. Another formulation was prepared at half the clay levels as outlined in Table 8. The slurry was allowed to stand for 24 h and the extent of settling for the two slurries is outlined in Table 9 below.

TABLE 9

Extent of settling (Δ %) of 4 lb/gal CMG slurries with Activator Solvent A as activator solvent, fumaric acid, and different levels of added clay

| Bentone 155 added (% of required formulation amount as defined in Table 8) | Δ = % Settling by volume with Activator Solvent A as activator at 24 h | Comments |
|---|---|---|
| 50% | −2% | VERY VISCOUS |
| 100% | −1.5% | Flowable |

Activator Solvent A when used as an activator is therefore able to provide a homogeneous stable flowable slurry at a higher 5 lb/gal guar concentration at 24 hours.

Example 9

HIGH Concentration 5/lb/gal Slurries with EGMBE and PnB 5 lb/gal Carboxymethyl Guar slurries (CMG) were prepared with EGMBE and PnB at half the clay levels using the process as outlined in Example 8 and with additional CMG in the proportions shown in table 8. The slurries were allowed to stand for 24 hrs in a 100 mL glass graduated cylinder. The slurries appeared to be more viscous initially than those prepared with Activator Solvent A. The extent of settling (Δ %) visible on top and the extent of caking (X %) at the bottom is shown in Table 10. Caking is due to settling of the guar particles at the bottom into a more dense sludge that is not overtly visible but may be measured by inverting a capped graduated cylinder and visualizing the thickness of the dense sludge that stays stuck to the bottom of the cylinder.

TABLE 10

Extent of settling (Δ %) and the extent caking (X %) of 5 lb/gal CMG slurries with EGMBE and PnB as activator solvents as compared to Activator Solvent A

| Activator Solvent | Δ = % Settling by volume at 24 h | X = % caking at bottom at 24 h |
|---|---|---|
| Activator Solvent A | −1.5% | 0.0% |
| EGMBE* | −1.5% | −20.0% |
| PnB* | −1% | −15% |

The slurries have added fumaric acid, and 50% of added clay (Bentone 155) based on the formulation in Table 8.

Though the 5 lb/gal slurries prepared above with EGMBE and PnB looked similar in performance to Activator Solvent A at 24 h, there appeared to a significant amount of caking (15-20%) observed with PnB and EGMBE when compared to Activator solvent A(0%). The caking would render the slurries unusable especially during bulk transport.

The present invention, therefore, is well adapted to carry out the objects and attain the ends and advantages mentioned, as well as others inherent therein. While the invention has been depicted and described and is defined by reference to particular preferred embodiments of the invention, such references do not imply a limitation on the invention, and no such limitation in scope is to be inferred.

What is claimed is:

1. A polysaccharide slurry composition comprising polysaccharide particles suspended in a stable polysaccharide particle suspension composition comprising:
   a carrier;
   an activator solvent comprising:
      a) at least one dibasic methyl or ethyl ester;
      b) at least one compound of formula (IIa):

      R$_3$OOC-A-CONR$_4$R$_5$ (IIa), wherein R$_3$ represents a C$_1$-C$_{36}$ alkyl group; wherein R$_4$ and R$_5$ individually represents a C$_1$-C$_{36}$ alkyl group, wherein R$_4$ and R$_5$ can optionally together form a ring; and wherein A is a linear or branched divalent C$_2$-C$_6$ alkyl group; or
      c) a combination a) and b);
   an organo clay compound; and
   optionally, a surfactant;
wherein the concentration of polysaccharide is greater than 4 pounds per gallon.

2. The polysaccharide slurry composition of claim 1 wherein the concentration of polysaccharide is at least 5 pounds per gallon.

3. The stable composition of claim 1 wherein the carrier is a non-aqueous carrier fluid that is not a dibasic ester or ester amide.

4. The stable composition of claim 1 further comprising an acid component.

5. The stable composition of claim 1 further comprising an acid component selected from the group consisting of fumaric acid, adipic acid, maleic acid, malic acid, and mixtures thereof.

6. The stable composition of claim 1 wherein the carrier is present in an amount ranging from about 25 to about 99 wt %, the activator solvent is present in an amount ranging from about 0.1 to about 10 wt %, the organo clay compound is present in an amount ranging from about 1 to about 10 wt %, and the surfactant is present in an amount ranging from about 0.1 to about 5 wt % based on the total weight of the stable polysaccharide particle suspension composition.

7. The stable composition of claim 1 wherein the carrier is present in an amount ranging from about 50 to about 99 wt %, the activator solvent is present in an amount ranging from about 0.1 to about 5 wt %, the organo clay compound is present in an amount ranging from about 1 to about 5 wt %, and the surfactant is present in an amount ranging from about 0.1 to about 3 wt % based on the total weight of the stable polysaccharide particle suspension composition.

8. The stable composition of claim 1 wherein the activator solvent ester diacid or a derivative thereof comprises at least one compound of formula (IIa) wherein R$_3$, R$_4$, and R$_5$ individually represents methyl or ethyl.

9. The stable composition of claim 1 wherein the activator solvent ester diacid or a derivative thereof comprises a diester selected from the group consisting of dialkyl methylglutarate, dialkyl ethylsuccinate, dialkyl adipate, dialkyl succinate, dialkyl glutarate, and a combination thereof, wherein each dialkyl is dimethyl or diethyl.

10. The stable composition of claim 1 wherein the activator solvent is a blend of dibasic esters comprising:
   (i) a first dibasic ester of formula:

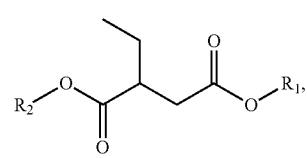

(I)

(ii) a second dibasic ester of formula:

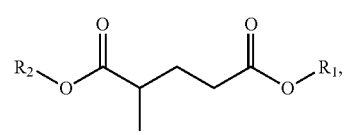

(II)

and
   (iii) optionally, a third dibasic ester of formula:

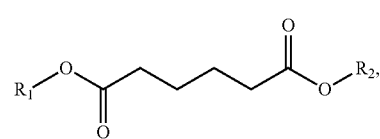

(III)

wherein R$_1$ and R$_2$ individually represent a C$_1$-C$_8$ alkyl group.

11. The stable composition of claim 1 wherein the carrier comprises mineral oil.

12. The stable composition of claim 1 wherein the organo clay compound comprises a modified bentonite, a modified attapulgite, a modified kaolinite, a modified halloysite, a modified chlorite, a modified vermiculite, a modified smectite, a modified montmorillonite, a modified hectorite, or a mixture thereof.

13. The stable composition of claim 1 wherein the organo clay compound comprises bentonite, hydrophobically modified bentonite, or a mixture thereof.

14. The stable composition of claim 1 wherein the surfactant is present and comprises at least one-nonionic surfactant.

15. The stable composition of claim 1 wherein the surfactant is present and comprises at least one alcohol ethoxylate, at least one alkyl phenol ethoxylate, at least one terpene alkoxylate, or any mixture thereof.

16. The stable composition of claim 1 wherein the surfactant comprises at least one cationic surfactant, at least one amphoteric surfactant, at least one zwitterionic surfactant, at least one anionic surfactant, at least one nonionic surfactant, or a combination thereof.

17. A method comprising:
mixing a carrier;
an activator solvent comprising
  a) at least one dibasic methyl or ethyl ester;
  b) at least one compound of formula (IIa):

$$R_3OOC\text{-}A\text{-}CONR_4R_5 \qquad \text{(IIa)},$$

wherein $R_3$ represents a $C_1$-$C_{36}$ alkyl group; wherein $R_4$ and $R_5$ individually represents a $C_1$-$C_{36}$ alkyl group, wherein $R_4$ and $R_5$ can optionally together form a ring; and wherein A is a linear or branched divalent $C_2$-$C_6$ alkyl group; or
  c) a combination a) and b);
an organo clay compound; and
optionally, a surfactant; to form a stable polysaccharide particle suspension composition; and
suspending polysaccharide particles in the stable polysaccharide particle suspension composition to form a stable slurry of polysaccharide particles wherein the concentration of polysaccharide is greater than 4 pounds per gallon.

18. The method of claim 17 wherein the concentration of polysaccharide is greater than 5 pounds per gallon.

* * * * *